(12) United States Patent
Cymbal et al.

(10) Patent No.: US 8,261,425 B2
(45) Date of Patent: Sep. 11, 2012

(54) METHOD OF MAKING A TELESCOPING STEERING COLUMN ASSEMBLY

(75) Inventors: William D. Cymbal, Freeland, MI (US); Richard K. Riefe, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 766 days.

(21) Appl. No.: 12/396,538

(22) Filed: Mar. 3, 2009

(65) Prior Publication Data

US 2009/0165280 A1    Jul. 2, 2009

Related U.S. Application Data

(60) Division of application No. 11/133,079, filed on May 19, 2005, now Pat. No. 7,516,985, and a continuation-in-part of application No. 10/797,959, filed on Mar. 11, 2004, now abandoned.

(60) Provisional application No. 60/572,553, filed on May 19, 2004.

(51) Int. Cl.
| | |
|---|---|
| *B21B 1/46* | (2006.01) |
| *B21B 13/22* | (2006.01) |
| *B22D 11/126* | (2006.01) |
| *B22D 11/128* | (2006.01) |
| *B23P 17/00* | (2006.01) |
| *B23P 25/00* | (2006.01) |

(52) U.S. Cl. ............... 29/527.1; 29/898.07; 29/898.12; 74/493; 280/775

(58) Field of Classification Search ............. 29/527.1, 29/898.07, 898.12, 525.13, 525.15, 234, 29/237, 282, 458, 527.2; 280/775; 74/493; 498/49

See application file for complete search history.

(56) References Cited

U.S. PATENT DOCUMENTS

| | | | | |
|---|---|---|---|---|
| 3,451,736 | A | * | 6/1969 | Riccio ........................... 384/537 |
| 3,572,303 | A | * | 3/1971 | Becker et al. ................. 123/365 |
| 3,667,530 | A | | 6/1972 | Gray |
| 3,703,105 | A | | 11/1972 | Milton et al. |
| 4,086,661 | A | | 4/1978 | Matsuyama et al. |
| 4,636,106 | A | | 1/1987 | Waisbrod |
| H242 | H | * | 4/1987 | Eng ................................ 29/525 |
| 4,667,530 | A | | 5/1987 | Mettler et al. |
| 4,981,049 | A | * | 1/1991 | Venable et al. ................. 74/493 |
| 5,086,661 | A | | 2/1992 | Hancock |
| 5,306,032 | A | | 4/1994 | Hoblingre et al. |
| 5,348,345 | A | * | 9/1994 | Dykema et al. ............... 280/777 |

(Continued)

FOREIGN PATENT DOCUMENTS

FR    2561605    3/1984
(Continued)

*Primary Examiner* — David Bryant
*Assistant Examiner* — Christopher Koehler
(74) *Attorney, Agent, or Firm* — Cantor Colburn LLP

(57) ABSTRACT

A telescoping steering column assembly includes upper and lower jackets having inner and outer surfaces and telescoping ends, respectively, and two sleeves disposed therebetween and having an annular cavity defined within each of the sleeves to hold bearings therewithin. One bearing is connected to the outer jacket and the other bearing is connected to the inner jacket. A method of making the assembly includes the steps of disposing the inner jacket within the outer jacket followed by disposing the sleeves therebetween and injecting a plastic material therethrough to form bearings. The plastic material is extracted from one of the apertures in each of the jackets to provide a sliding engagement between one of the bearing and the inner jacket and another bearing and the outer jacket.

8 Claims, 5 Drawing Sheets

U.S. PATENT DOCUMENTS

| | | | |
|---|---|---|---|
| 5,590,565 | A | 1/1997 | Palfenier et al. |
| 5,700,032 | A | 12/1997 | Fukunaga |
| 5,722,300 | A * | 3/1998 | Burkhard et al. ............... 74/493 |
| 5,743,150 | A | 4/1998 | Fevre et al. |
| 5,758,545 | A | 6/1998 | Fevre et al. |
| 5,769,453 | A | 6/1998 | Peitsmeier et al. |
| 5,845,936 | A | 12/1998 | Higashino |
| 5,927,152 | A | 7/1999 | Marzio et al. |
| 5,992,263 | A | 11/1999 | Bleuel et al. |
| 6,139,057 | A | 10/2000 | Olgren et al. |
| 6,254,131 | B1 | 7/2001 | Link |
| 6,354,626 | B1 | 3/2002 | Cartwright |
| 6,371,519 | B1 | 4/2002 | Jurik et al. |
| 6,389,923 | B1 | 5/2002 | Barton et al. |
| 6,419,269 | B1 | 7/2002 | Manwaring et al. |
| 6,450,531 | B1 | 9/2002 | Rinker et al. |
| 6,467,807 | B2 | 10/2002 | Ikeda et al. |
| 6,473,968 | B1 | 11/2002 | Mastrofrancesco et al. |
| 6,514,001 | B1 | 2/2003 | Yezersky et al. |
| 6,519,001 | B1 | 2/2003 | Lee |
| 6,557,318 | B2 | 5/2003 | Graber |
| 6,948,401 | B2 | 9/2005 | Zernickel et al. |
| 2006/0243088 | A1 * | 11/2006 | Cymbal et al. .................. 74/492 |

FOREIGN PATENT DOCUMENTS

GB      2184213      6/1987

* cited by examiner

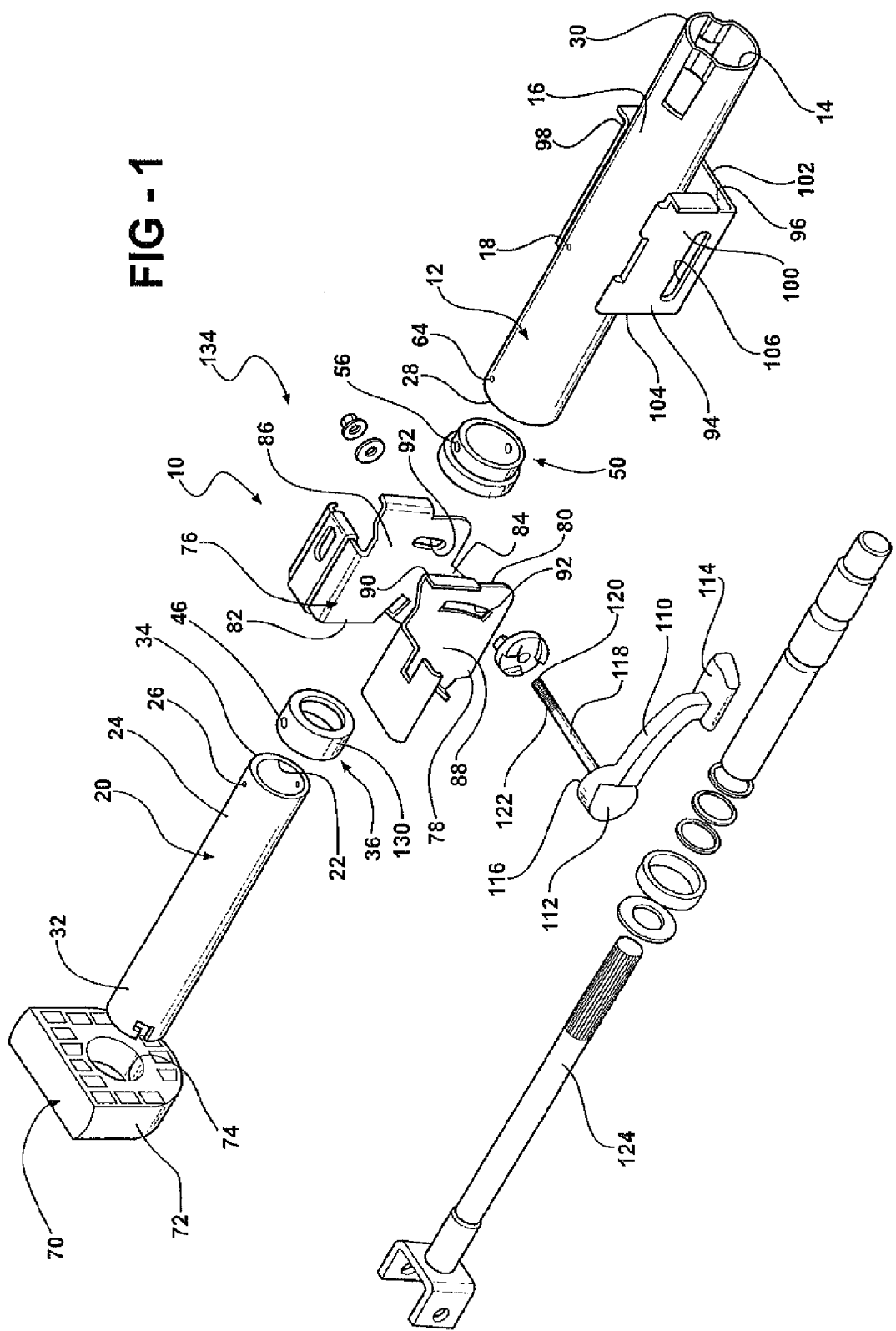

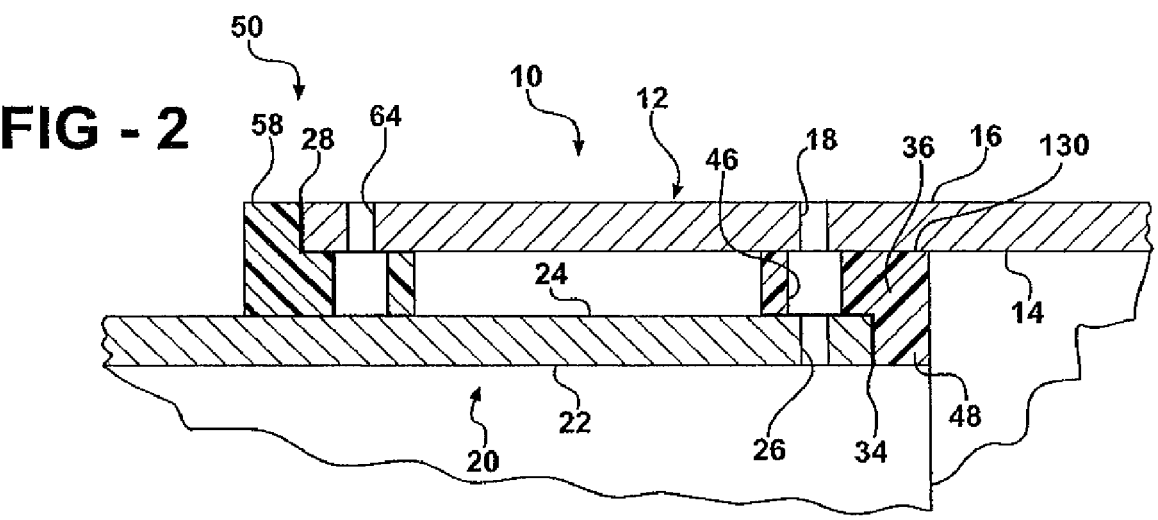
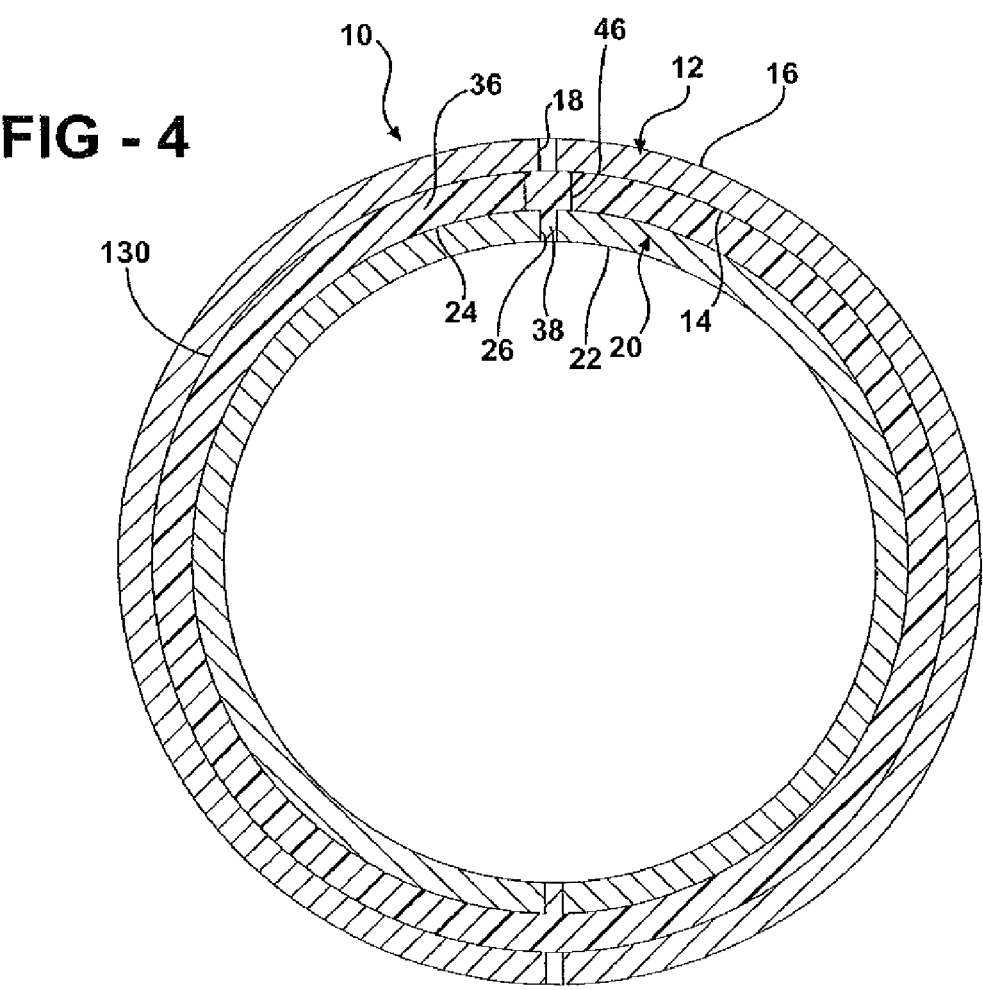

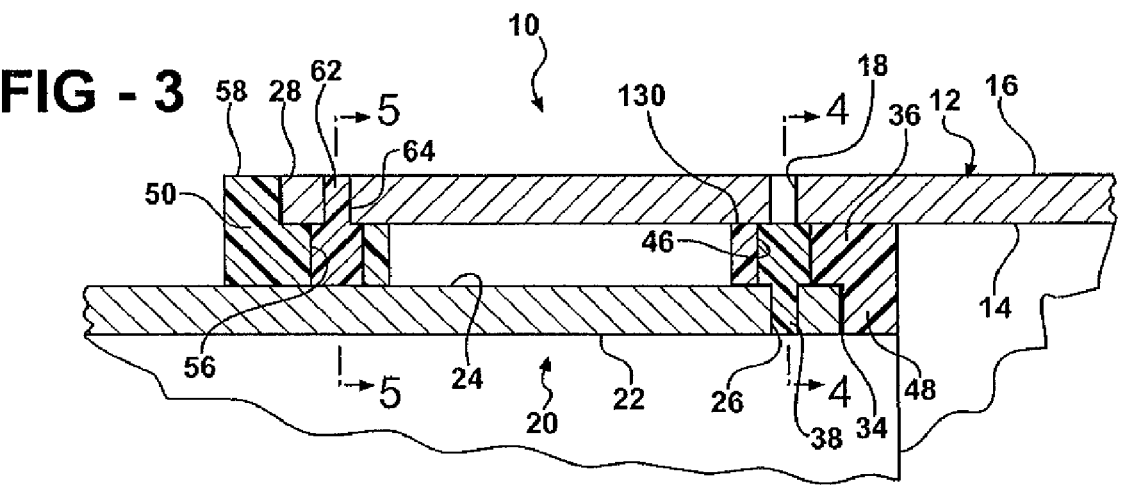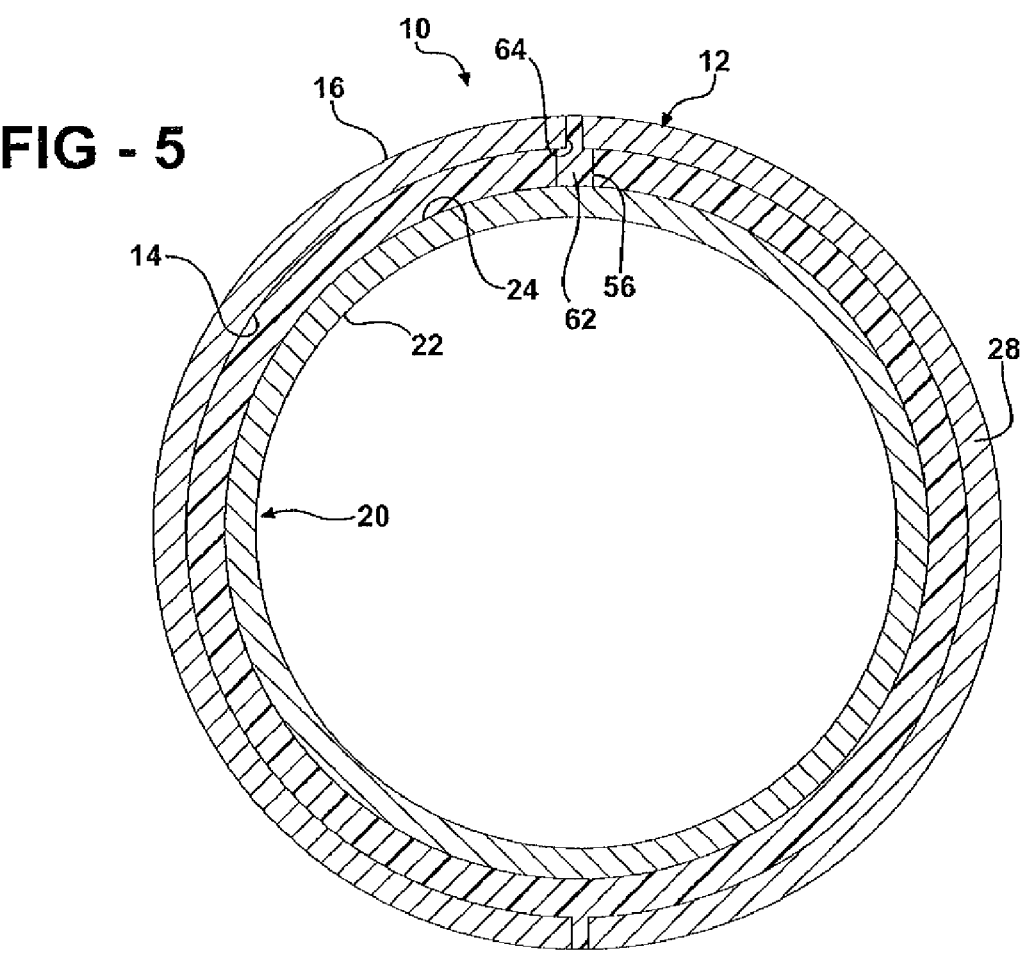

METHOD OF MAKING A TELESCOPING STEERING COLUMN ASSEMBLY

CROSS REFERENCE TO RELATED APPLICATIONS

This application is a division of U.S. application Ser. No. 11/133,079 for a MULTIPIECE BEARING FOR TELESCOPING STEERING COLUMN ASSEMBLY, filed May 19, 2005, and claims the benefit of U.S. Provisional Patent Application Ser. No. 60/572,553 for a MULTIPIECE BEARING FOR TELESCOPING STEERING COLUMN ASSEMBLY, filed on May 19, 2004, which is hereby incorporated by reference in its entirety. This application also claims the benefit of U.S. patent application Ser. No. 10/797,959 for a MULTIPIECE BEARING FOR TELESCOPING STEERING COLUMN ASSEMBLY, filed on Mar. 11, 2004, which is hereby incorporated by reference in its entirety.

BACKGROUND OF THE INVENTION

1. Field of the Invention

The subject invention relates to a vehicle steering column having jackets engaged with each other in a telescoping fashion to adjust a height position of a steering wheel.

2. Description of the Prior Art

Generally, a variety of tilting and telescoping steering column arrangements have been developed and are used today. A telescoping steering column assembly typically uses two jackets, wherein one jacket is fixed to a frame of a vehicle body, and the other jacket is adapted to be translated with respect to the jacket fixed to the frame, thereby providing relative longitudinal movement between the two jackets with respect to one another. These jackets, engaged one within another in a telescoping fashion, allow the driver to push or pull the steering wheel to a desired position and then to lock the telescoping column. Three fundamental conditions are desirable for telescoping adjustment: low adjustment force, secure locking of the jackets with respect to one another after adjustment, and the stiffness of the steering column should not be degraded.

Various configurations and designs are available in the prior art for linear guide mechanism for adjusting telescoping steering column assemblies and have been disclosed in U.S. Pat. No. 3,703,105 to Milton et al., U.S. Pat. No. 4,667,530 to Mettler et al., U.S. Pat. No. 5,306,032 to Hoblingre et al., U.S. Pat. No. 5,086,661 to Hancock, U.S. Pat. No. 5,590,565 to Palfenier et al., U.S. Pat. No. 5,722,300 to Burkhard et al., U.S. Pat. No. 6,354,626 to Cartwright, U.S. Pat. No. 6,371,519 to Jurik et al., U.S. Pat. No. 6,389,923 to Barton et al., and U.S. Pat. No. 6,473,968 to Mastrofrancesco et al. In addition, various configurations and designs for linear guide mechanism for adjusting telescoping steering column assemblies have been disclosed in United Kingdom Patent No. GB 2184213 to Arnold, French Patent No. 2561605 to Haldric, and PCT Patent Application No. WO 02/064989 to Zemickel et al. Several prior art designs include a sleeve bearing disposed between the jackets.

SUMMARY OF INVENTION

A telescoping steering column assembly of the present invention includes an outer jacket having inner and outer surfaces with an aperture extending between said surfaces thereof and an inner jacket having inner and outer surfaces with an aperture extending between the surfaces thereof. The upper and inner jackets have telescoping ends disposed in overlapping telescoping relationship with one another. A bearing of plastic material is disposed annularly about the outer surface of the inner jacket and engages the inner surface of the outer jacket. The bearing is disposed in a sliding engagement over the aperture in one of said jackets and includes a projection extending into the aperture in the other of the jackets.

The present invention includes a method of making a telescoping steering column assembly comprising the steps of disposing an inner jacket having an aperture extending between inner and outer surfaces and a telescoping end in telescoping relationship within an outer jacket having an aperture extending between inner and outer surfaces and a telescoping end. The next step of the method includes injecting a plastic material between the upper and inner jackets and into the respective apertures in the jackets, followed by the step of removing the plastic material from the aperture in only one of the jackets.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 is an exploded view of a telescoping steering column assembly according to the exemplary of the invention;

FIG. 2 is a first fragmentary cross sectional view of a inner jacket disposed within an outer jacket;

FIG. 3 is a second fragmentary cross sectional view of the inner jacket disposed within the outer jacket;

FIG. 4 is a cross-sectional view taken along section line 4-4 of FIG. 3;

FIG. 5 is a cross-sectional view taken along section line 5-5 of FIG. 3;

DETAILED DESCRIPTION OF THE EXEMPLARY EMBODIMENT

Figure 6:
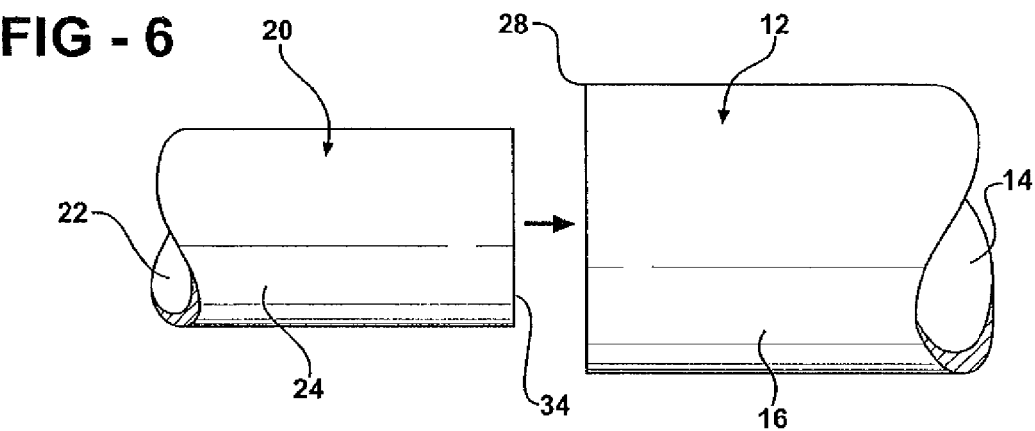
FIG. 6 shows a step of disposing the inner jacket in a telescoping relationship within the outer jacket of a method of the present invention.
Figure 7:
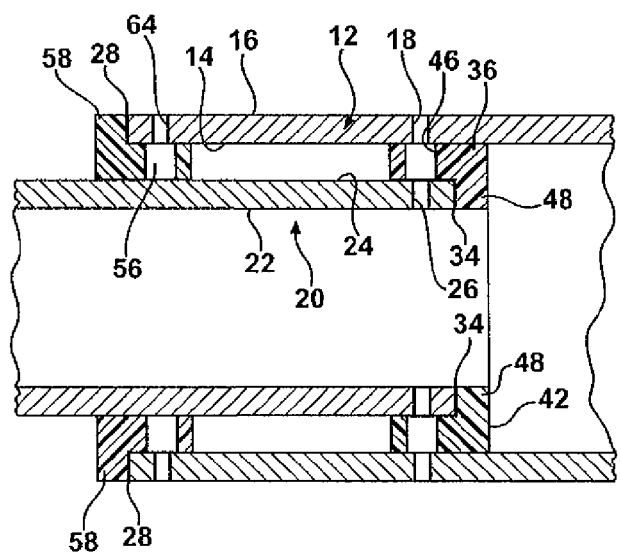
FIG. 7 shows a step of disposing the bearings annularly about the inner jacket and within the outer jacket.
Figure 8:
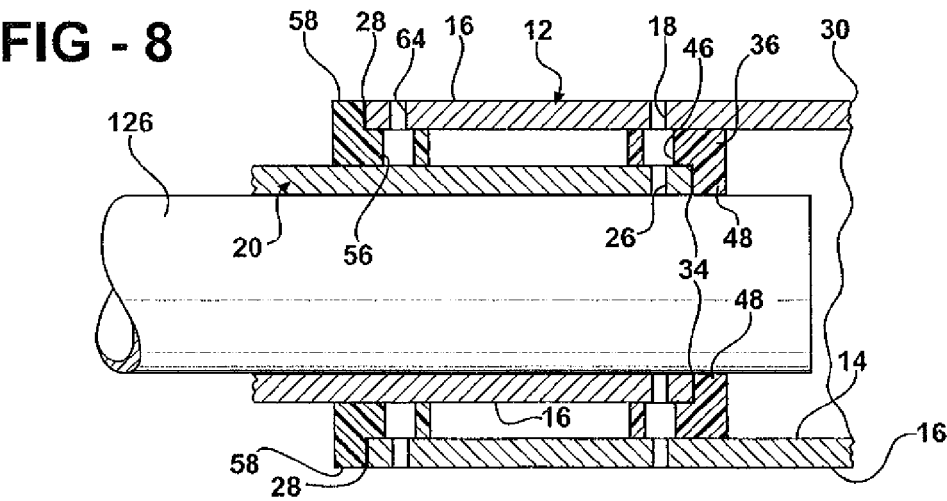
FIG. 8 shows a step of inserting a bar into the inner jacket to prevent a plastic material from penetrating the inner jacket.

An exemplary telescoping steering column assembly 10 includes an outer jacket 12 having an inner surface 14 and an outer surface 16. An aperture 18 extends between the surfaces 14, 16. The telescoping steering column assembly 10 also includes an inner jacket 20 having an inner surface 22 and an outer surface 24. An aperture 26 extends between the surfaces 22, 24. The outer jacket 12 and the inner jacket 20 have telescoping ends 28, 30, 32, 34. The end 34 is received in the end 28, as best shown in FIG. 6. A steering shaft 124 extends through the jackets 12, 20.

The telescoping steering column assembly 10 includes a lower mounting mechanism 70 for connecting the inner jacket 20 to a vehicle body (not shown). The exemplary lower mounting mechanism 70 includes a lower bracket 72 of a generally rectangular configuration having an aperture 74 defined therewithin to engage one of the end 34 of the inner jacket 20. The telescoping steering column assembly 10 also includes an upper mounting mechanism 76 to slidably support the outer jacket 12 for telescoping movement relative to the inner jacket 20 between various positions. The upper mounting mechanism 76 includes an upper bracket 78 having first and second ends 80, 82, a bottom 84, and sides 86, 88 extending upwardly from the bottom 84 to define a aperture 90. The outer jacket 20 is moveably positioned in the aperture 90. The upper bracket 78 includes a slot 92 defined within each of the sides 86, 88 at the first end 80.

A compression bracket 94 is fixedly engaged with the outer jacket 12 and includes a bottom 96 and side walls 98, 100. The compression bracket 94 extends between first and second ends 102, 104 and also includes a slot 106 defined by the side walls 98, 100. The slots 106 extend generally perpendicularly to the slots 92 of the upper bracket 78.

The bracket 78 is fixedly engaged with the vehicle and a locking assembly 134 can be selectively engaged to lock the outer jacket 20 and the bracket 78 with respect to one another. The locking assembly 134 includes a release lever 110 having a shoulder 112 at one end and a plate 114 at another end. The shoulder 112 includes an inner surface 116. A rod 118 extends outwardly from the shoulder 112 to a distal end 120 having a thread 122. A cam member 136 cooperates with the surface 116 to selectively urge the sides 86, 88 together to press against the bracket 94. In operation, when the release lever 110 is rotated about the rod 118 in a first direction, the sides 86, 88 press against the bracket 94 to lock the outer jacket 12. When the release lever 110 is rotated about the rod 118 in a second direction opposite the first direction, the sides 86, 88 can move away from the bracket 94 to unlock the outer jacket 12.

A bearing 36 is disposed annularly about the outer surface 24 of the inner jacket 20 and includes a bearing surface 130 slidably engaged with the inner surface 14 of the outer jacket 12. The exemplary bearing 36 also includes an aperture 46. The aperture 46 is open to the outer jacket 12 and the inner jacket 20. The aperture 46 is larger than the aperture 18. The bearing 36 also includes a lip 48 extending from the portion 42 and abuts the end 34 of the inner jacket 20.

Figure 9:
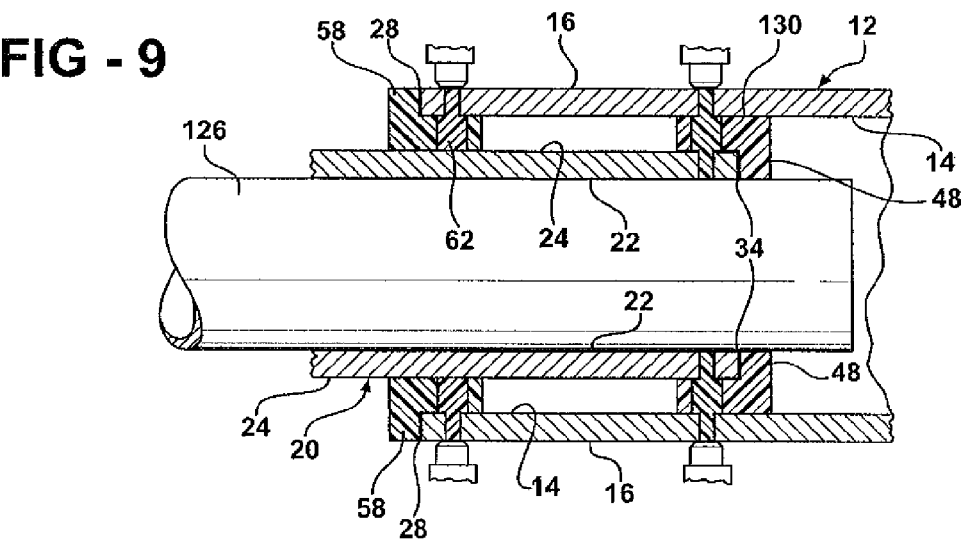
FIG. 9 shows a step of injecting the plastic material through the jackets and the bearings.
Figure 10:
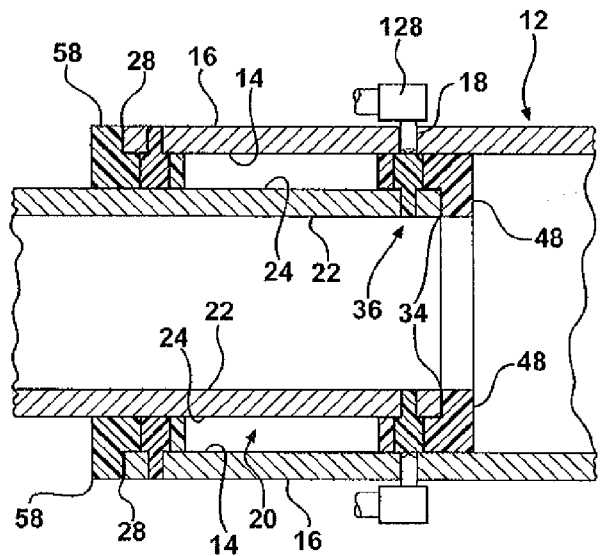
FIG. 10 shows a step of removing the plastic material from apertures of the outer jacket.

When the jackets 12, 20 are engaged such that the apertures 18 and 26 are at least partially aligned, plastic in liquid form can be injected into the aperture 18 to fill the apertures 46 and 26, as best shown in FIG. 9. A rod 126 can be inserted in the inner jacket 20 to block flow of plastic. The plastic cools and hardens after injection and forms a projection 38 extending in the aperture 26 and in the aperture 46 to fixedly engage the bearing 36 and the inner jacket 20 together. The portion of the plastic that hardens in the aperture 18 can be removed, as shown in FIG. 10, with a drill 128 to allow the outer jacket 12 to move relative to the bearing 36. The aperture 46 is larger than the aperture 18 and, as a result, the hardened portion of plastic disposed in the aperture 46 cannot pass through the aperture 18.

Figure 11:
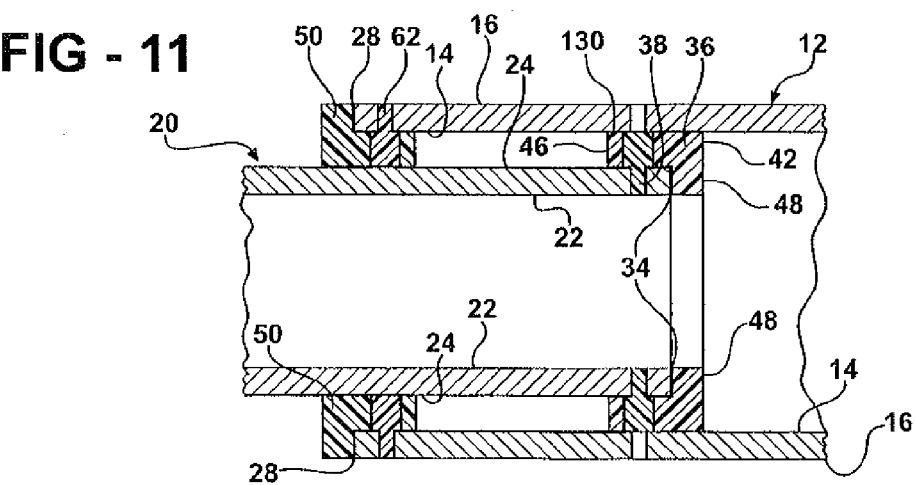
FIG. 11 shows a step of removing the plastic material from apertures of the inner jacket.

A second bearing 50, as shown in FIG. 11, in conjunction with the other Figures, is disposed on the outer jacket 12 at the end 28 and encircles the inner jacket 20. The second bearing 50 includes an aperture 56. The aperture 56 is open to the inner surface 14 of the outer jacket 12 and to the outer surface 24 of the inner jacket 20. The second bearing 50 also includes a lip 58 extending from the portion 54 and abuts the end 28 of the outer jacket 12. The bearing 36 and the second bearing 50 radially overlap one another as shown in the drawings. In other words, the bearing 36 extends radially outwardly from the outer surface 24 and the bearing 50 extends radially inwardly from the inner surface 14 such that the bearings 36, 50 would contact one another if the jackets 20 were withdrawn from the jacket 20.

The outer jacket 12 also includes an aperture 64. When the jackets 12, 20 are engaged such that the apertures 64 and 56 are at least partially aligned, plastic in liquid form can be injected into the aperture 64 to fill the apertures 64 and 56, as best shown in FIG. 9. The plastic cools and hardens after injection and forms a projection 62 extending in the aperture 56 and in the aperture 64 to fixedly engage the bearing 50 and the outer jacket 12 together.

As shown in the drawings, both the first and second bearings 36, 50 can include a plurality of apertures to receive plastic. In such an embodiment of the invention, the outer jacket 12 would have a corresponding number of apertures.

Obviously, many modifications and variations of the present invention are possible in light of the above teachings. The invention may be practiced otherwise than as specifically described within the scope of the appended claims. These antecedent recitations should be interpreted to cover any combination in which the incentive novelty exercises its utility.

What is claimed is:

1. A method of making a telescoping steering column assembly comprising the steps of:
    engaging an outer jacket having a first inner and a first outer surface in telescoping relationship with an inner jacket having a second inner and a second outer surface, said outer jacket having a first aperture extending between said first surfaces and said inner jacket having a second aperture extending between said second surfaces;
    annularly disposing a bearing having a third aperture about the second outer surface of the inner jacket to slidably engage the first inner surface of the outer jacket;
    aligning the first and second and third apertures; and,
    injecting liquid plastic in the first and second and third apertures.

2. The method as set forth in claim 1 further comprising the step of solidifying the plastic to fixedly engage the inner jacket and the bearing.

3. The method of claim 2 further comprising the steps of annularly disposing a second bearing having a fourth aperture about the first inner surface of the outer jacket to slidably engage the second outer surface of the inner jacket; and forming a fifth aperture in the outer jacket.

4. The method of claim 3 further comprising the steps of aligning the fourth aperture and the fifth aperture with respect to one another.

5. The method of claim 4 further comprising the step of injecting liquid plastic in the fourth aperture and the fifth aperture after said aligning the fourth and fifth aperture with respect to one another.

6. The method of claim 5 further comprising the step of solidifying the plastic in the fourth aperture and the fifth aperture to fixedly engage the outer jacket and the second bearing.

7. The method of claim 6 wherein said aligning the first and second and third aperture is further defined as being concurrent with said aligning the fourth and fifth aperture.

8. The method of claim 7 wherein said injecting liquid plastic in the first and second and third apertures is further defined as being concurrent with said injecting liquid plastic in the fourth aperture and the fifth aperture.

* * * * *